United States Patent

Kesinger

[15] 3,698,131
[45] Oct. 17, 1972

[54] PLANT COVER AND METHOD
[72] Inventor: Donald A. Kesinger, Denver, Colo.
[73] Assignee: The Gates Rubber Company, Denver, Colo.
[22] Filed: March 31, 1971
[21] Appl. No.: 129,772

[52] U.S. Cl. ..............................47/29, 47/2, 47/19, 160/6, 49/2, 49/31, 206/DIG. 30, 73/368
[51] Int. Cl..........................A01g 13/04, E05f 15/20
[58] Field of Search..................47/2, 17, 19, 20–22, 47/26–30; 49/2, 31; 160/6; 206/DIG. 30; 73/368; 62/530; 165/46

[56] References Cited

UNITED STATES PATENTS

| | | | |
|---|---|---|---|
| 848,853 | 4/1907 | Reed | 160/6 |
| 2,300,776 | 11/1942 | Collins | 47/19 UX |
| 2,489,879 | 11/1949 | Grebe | 49/2 |
| 2,592,976 | 4/1952 | Thomas | 47/19 X |
| 3,315,409 | 4/1967 | Poulin | 47/26 X |
| 3,353,297 | 11/1967 | Gervais | 47/29 X |
| 3,403,472 | 10/1968 | Raucourt | 49/31 |
| 3,481,076 | 12/1969 | Bedard | 49/2 X |

*Primary Examiner*—Robert E. Bagwill
*Attorney*—Raymond Fink, H. W. Oberg, Jr. and Curtis H. Castleman, Jr.

[57] ABSTRACT

A plant cover having a thermally responsive actuator for venting purposes. The actuator includes a hermetically sealed plyable bag containing an amount of vaporizable liquid that when vaporized expands the bag to effect actuator actuation. A method of growing plants using the plant cover of the invention including planting in an earthen trough and covering the trough with a plant cover of the invention.

11 Claims, 6 Drawing Figures

PATENTED OCT 17 1972

INVENTOR
DONALD A. KESINGER
BY H. H. Oberg Jr
ATTORNEY

INVENTOR.
DONALD A. KESINGER
BY H. H. Oberg Jr
ATTORNEY

PLANT COVER AND METHOD

BACKGROUND OF THE INVENTION

The invention relates to plant husbandry, but more particularly, the invention relates to plant covers of the type that protect plants from damage caused by climatic temperature conditions.

It is desirable to plant seeds or seedlings of certain agricultural crops as early as possible in a growing season. Early planting may be directed toward the following goals: 1) planting more than one crop during a growing season; 2) assuring full maturity of a crop; or 3) early marketing of a crop.

In some locals, daytime temperatures may be high enough to sustain plant growth but temperatures during the night or a few days may be cool enough to damage the plants or curtail their growth.

It was early recognized that a plant protector or cover having a thermally responsive venting means is advantageous. Such a plant protector is disclosed by U.S. Pat. No. 585,009 as issued to Taylor et al. However, devices such as Taylor's are unsatisfactory and too expensive for present day agricultural needs. The devices are also unsatisfactory when taken in view of improved thermally responsive actuators such as disclosed by U.S. Pat. No. 2,489,879 as issued to Grebe.

To meet present day growing needs, it is common practice in many agricultural areas to cover a row of plants with a tent-like structure of wooden stakes, wire, and pliable, light-transparent material. The structure or "plant cover" must be manually attended to assure a tolerable or stimulating environment for the plants. During daylight hours, the plant cover may be manually vented by partial disassembly. Venting protects the plants from damaging high temperatures that could develop underneath the plant cover. The plants must be manually recovered to protect them from harmfully cold night or day temperatures. This invention is directed toward overcoming the manual operation of present-day plant covers.

SUMMARY OF THE INVENTION

In accordance with the invention, an actuator is provided which is capable of automatically venting a plant cover in response to thermal conditions such as solar radiation, ground radiation, or ambient temperature changes. The actuator includes a hermetically sealed pliable bag that contains a vaporizable liquid that when vaporized expands and inflates the bag to effect actuation. Also provided is a plant cover in the form of at least one strip of light transparent and pliable material. Thermally responsive actuators are arranged along at least one edge of the strip to displace the strip and vent the plant cover in response to changes in the thermal environment.

A method of growing plants is provided in conjunction with the plant covers of the invention where an earthen trough is prepared to define generally parallel earthen ridges. Planting is accomplished in the trough and a strip of light transparent material is positioned over the trough. The edges of the strip are anchored and thermally responsive actuators are placed along and between at least one edge of the strip and one earthen ridge. The edge of the strip is displaced to vent the plant cover automatically in response to local thermal conditions.

Accordingly, it is an object of the invention to provide an inexpensive but reliable thermally responsive actuator that may be used to effect venting of a plant cover.

Another object of the invention is to provide an actuator for plant covers that is thermally responsive to ground radiation, solar radiation, and temperatures surrounding the plant cover.

Still another object of the invention is to provide a thermally responsive actuator which may be used in combination with present day plant covers.

Another object of the invention is to provide a plant cover having venting means controlled by an inexpensive, thermally responsive actuator.

And another object of the invention is to provide a method for growing plants in conjunction with a thermally responsive plant cover that stimulates growth.

These and other objects or advantages of the invention will become apparent by reviewing the drawings and description thereof wherein.

DESCRIPTION OF PREFERRED EMBODIMENT

Figure 1:
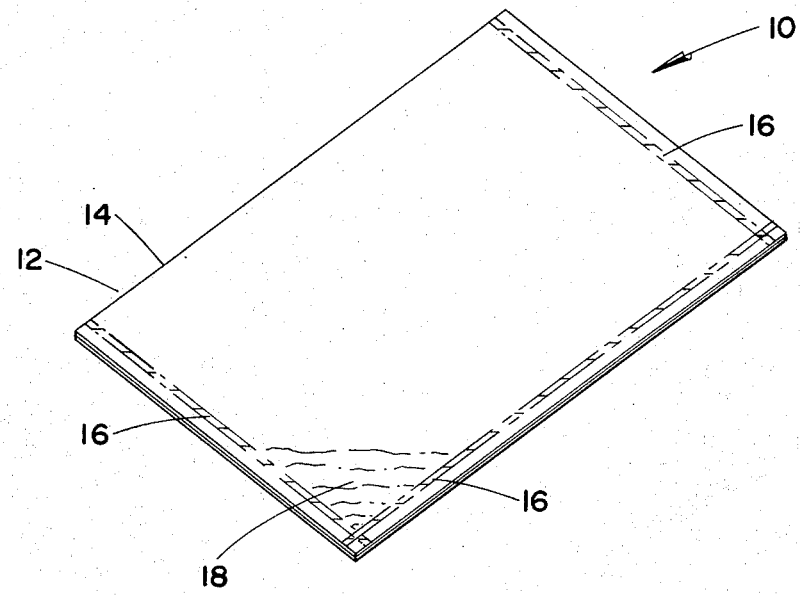
FIG. 1 is an isometric view of an uninflated actuator of the invention.
Figure 2:
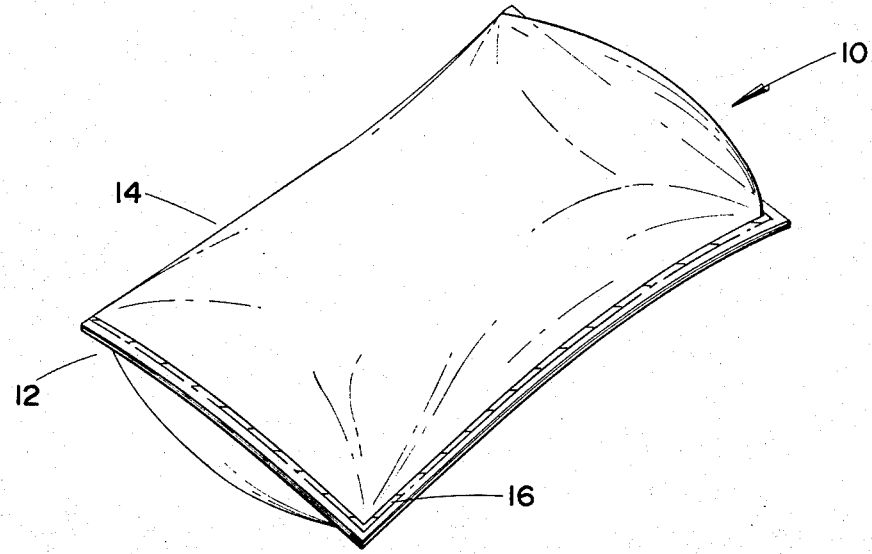
FIG. 2 is an isometric view showing actuation of the FIG. 1 actuator.

Referring to FIGS. 1 and 2 a thermally responsive actuator 10 is provided in accordance with the invention. The actuator 10 is made of a pliable and generally gas impermeable material such as a plastic or elastomeric film. One satisfactory material is a polyester film that is sold under the trademark Mylar.

The material is formed into a bag or enclosure of any desired shape. Preferably, the bag is formed into a rectangular or pillow shape 12. A bag may be easily formed by folding 14 a piece of film material and hermetically sealing 16 the peripheral edges together by welding or cementing. The bag is formed in a collapsed or flattened state so there is little or no air entrapped therein. A small amount of heat vaporizable liquid 18 is injected into the bag just prior to sealing. Together, the bag and liquid entrapped therein define a thermally responsive actuator 10.

Various types of low boiling point liquids may be used to achieve a desired thermal response which will later be discussed. Liquids having a boiling point generally between the range of 65° to 90° Fahrenheit have proven satisfactory. Preferably, a non-flamable liquid is used such as a fluorinated hydrocarbon sold under the trademark Freon. A sufficient amount of liquid is injected to inflate the bag when the liquid is vaporized as shown in FIG. 2. The amount of liquid injected may be readily determined by known methods once the bag size and type of liquid is established. For example, a bag that when flat measures 17 by 28 centimeters, may be satisfactorily inflated when approximately 9 cubic centimeters of liquid freon are vaporized in the bag. With the vaporizable fluid sealed in the bag, the actuator is ready for use.

Actuation is accomplished as the actuator is inflated and deflated in response to the liquid being alternately vaporized and condensed. The liquid is vaporized, FIG. 2, as the thermal environment of the actuator imparts sufficient heat to boil the liquid. Conversely, the liquid is condensed, FIG. 1, as the actuator thermal environment receives heat from the liquid.

The thermal environment of the actuator includes earth radiation, solar radiation, ambient conditions, and any other heat source located near the actuator. The thermal response of the actuator may be affected by changing any part of the thermal environment. For example, the actuator may be selectively colored to magnify or reduce the effect of solar or earth radiation. The actuator may be positioned adjacent or away from the ground or other heat source to change its response time.

When the liquid vaporizes, pressure forces are generated in all directions as the bag is inflated. Thus, a multitude of actuation movements are available when the bag is expanded. The actuation movements may better be understood when the actuator is used in conjunction with a plant cover.

Figures 3, 4:
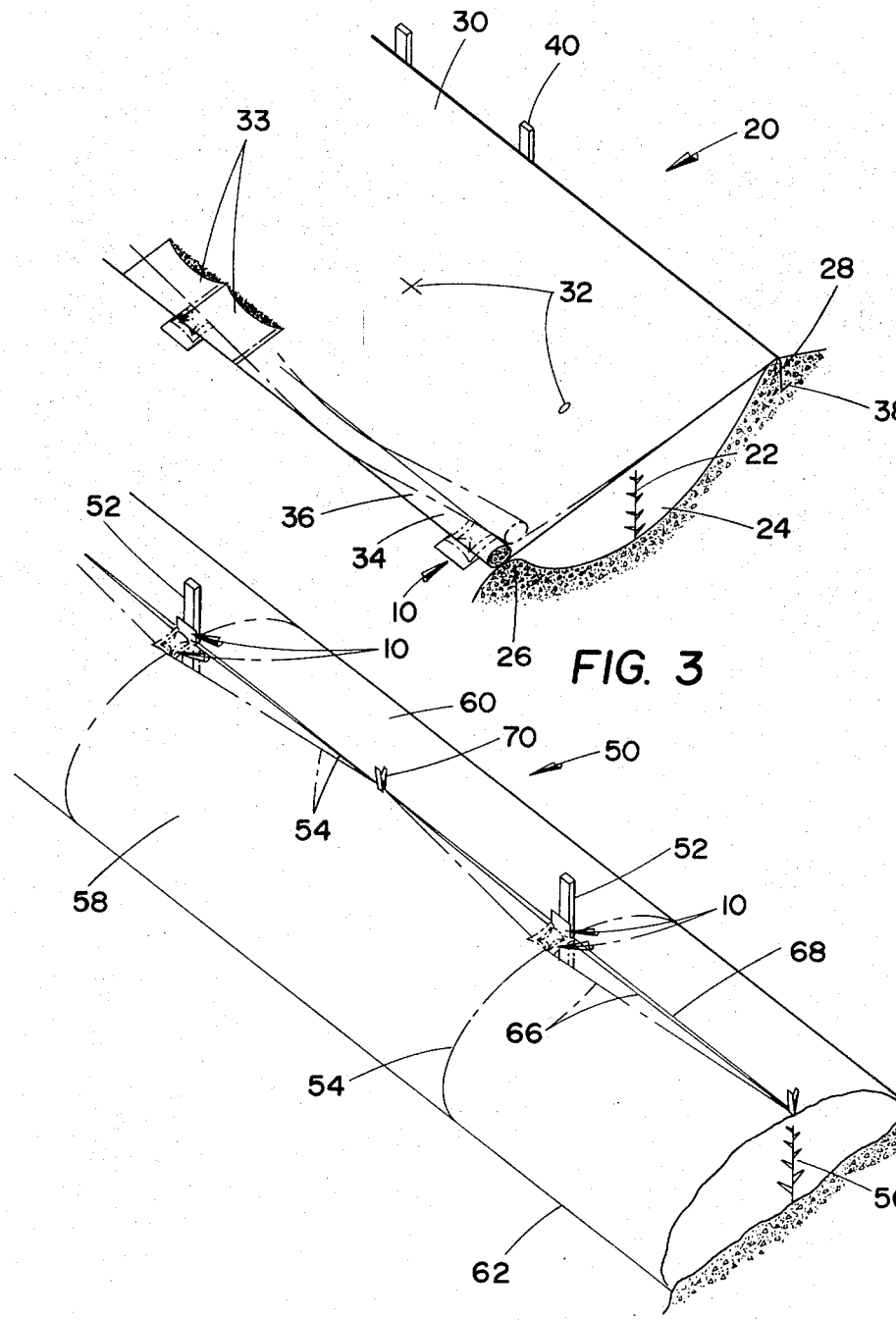
FIG. 3 is an isometric view and partial cutaway of a plant cover of the invention as positioned over a row of plants.
FIG. 4 is an isometric view and partial cutaway of an alternate form of a plant cover of the invention.

Referring now to FIG. 3, a plant cover 20 of the invention is shown in position over a row of plants 22. To use the plant cover, an earthen trough 24 is prepared to form two earthen ridges 26, 28. The earthen ridges may have the same or different heights. Preferably, the ridges 26, 28 are generally parallel or equidistant. The trough 24 has sufficient depth and width to accommodate a plant of desired size. Seeds, seedlings, or plants are placed along the bottom of the trough to form a row. A strip of light-transparent material 30 is positioned over the trough and along the earthen ridges 26, 28. Shading by the cover may be eliminated or reduced by preparing ridges of different height so the plant cover is tilted or angled toward the prevailing direction of the sun. Preferably, the strip 30 is of a pliable plastic for economical reasons. Drain holes 32 or slits are formed at spaced-apart intervals along the strip. The holes prevent moisture from accumulating on top of the strip and weighting the strip to displace it to an undesirable position. Soil or weight retaining means such as in the form of pockets 33 or tubes 34 may be located or fabricated along one 36 or both longitudinal edges of the strip by known methods. Such pockets or tubes provide means for anchoring the strip into position over the trough 24. Alternately, a longitudinal edge of the strip may be buried 38 or staked 40 into position over the trough. A plurality of thermally responsive actuators of any desired type are spaced-apart along at least one longitudinal edge 36 of the strip. The actuators 10 are positioned between the edge 36 of the strip and an earthen ridge 26. The actuators may be attached to the strip if desired. Preferably, actuators 10 of the type as disclosed by FIGS. 1 and 2 are used. The actuators lift the edge 36 of the strip in response to a thermal condition which is too hot and vents the trough 24 to lower the temperature therein. Should the temperature within the trough 24 become too cold, the actuators collapse in response to the thermal condition and the strip 20 is returned to a protective position over the trough.

Here, the thermal sensitivity of the actuator of the invention should be noted. When placed on the ground, the actuator thermal response is directly influenced by ground temperature. When the actuator is positioned so a portion thereof extends into the trough, thermal response is influenced by the temperature in the trough. Thus, the actuator may be selectively positioned to thermally respond to a desired condition.

ADDITIONAL SPECIES

Referring now to FIG. 4, actuators 10 of the invention are shown in combination with a plant cover 50 somewhat in the form of a tent. The plant cover is constructed by forming a framework of stakes 52 and wire 54 over a row of plants 56. Two or more strips 58, 60 of light transparent and pliable material, such as plastic, are positioned over the framework. One parallel edge of each strip 62, 64 is anchored to near the base of the plant row such as by burying. The second edge of each strip 66, 68 are juxtaposed to define the top of the tent structure. The strips are intermittently fastened to the wire framework 54 with any desired fastener 70. An actuator 10 of the invention is positioned between the juxtaposed edges 66, 68 of the strips and wire framework 54. Actuation of the actuators separate the juxtaposed edges 66, 68 of the strips and vents the plant cover to lower the temperature therein. The wires 54 of the framework bias the edges to a juxtaposed position should the thermal environment be such to deflate the actuator.

Figure 5:
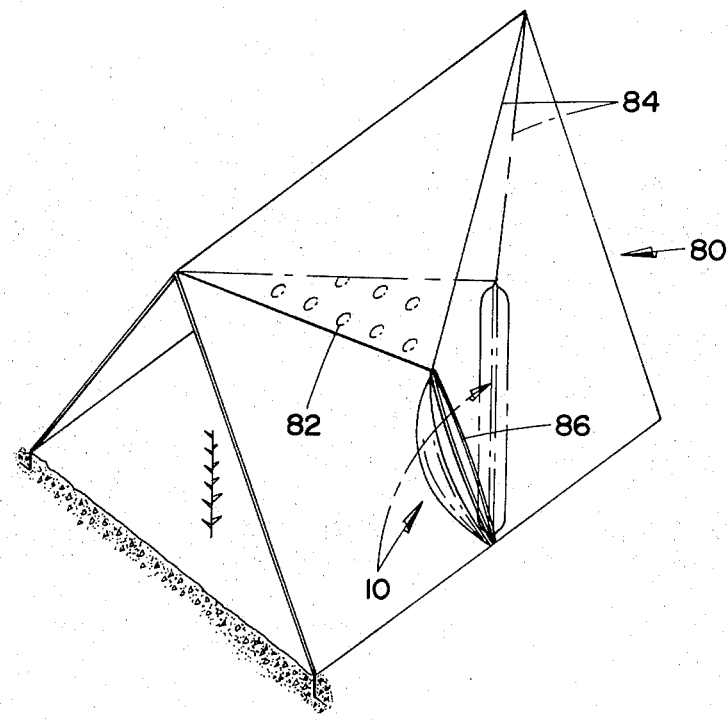
FIG. 5 is an isometric and partial cutaway view of an alternate form of the invention.

Referring now to FIG. 5, a light transparent structure is arranged in tent fashion over a plant row to define a plant cover 80. A plurality of vent holes 82 are located in the cover near the top. A flap 84 is attached to the cover near the vent holes 82. The flap 84 is arranged such that it is capable of blocking or covering the vent holes. An actuator 10 of the invention is positioned between the flap 84 and the cover 80 to actuate the flap. The vent holes 82 are alternately covered and uncovered by the flap as the actuator responds to thermal environmental changes in a manner as previously described. Optionally, a bias means 86 may be used to bias the flap into position over the vent holes. The bias means is particularly useful in windy areas because wind may lift the flap away from the vent holes during low temperature periods. The bias means may be the actuator itself where the actuator is made of an elastomeric material.

Figure 6:
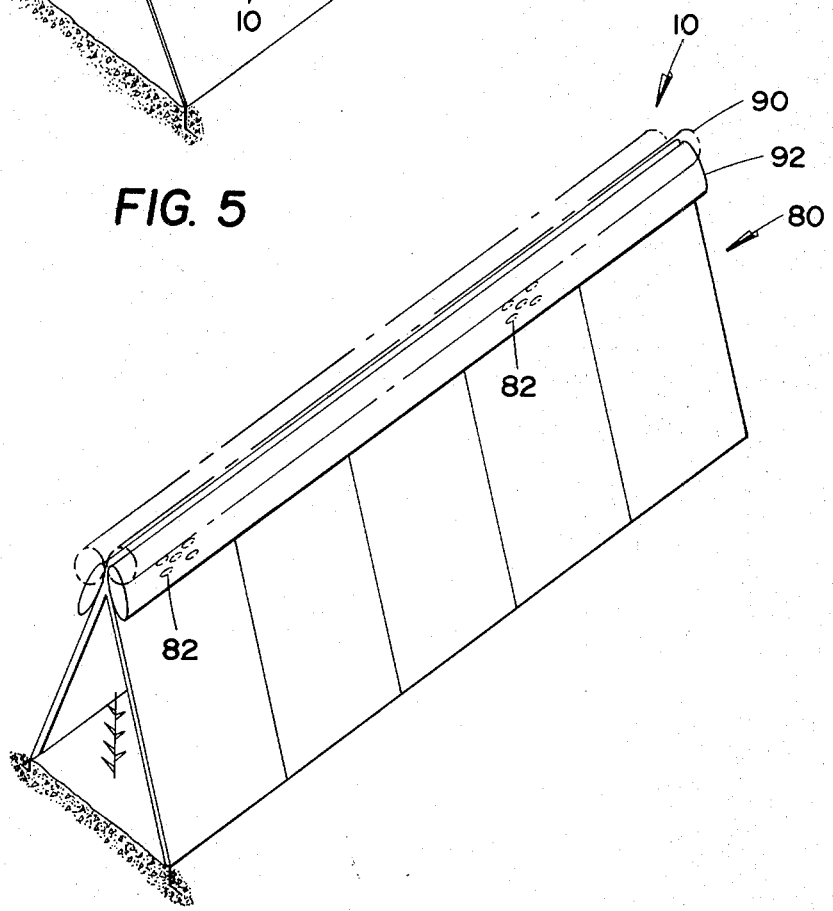
FIG. 6 is an isometric view showing an alternate form of the invention.

Referring to FIG. 6, a plant cover similar to that of FIG. 5 is shown. However, a flap is not used. A thermally responsive actuator of the invention is attached to the plant cover near the vent holes. The actuator 10 operates in a manner as previously explained. As the actuator is inflated 90, it displaces itself to a position away from the vent holes 82. When the actuator is deflated 92, it is relaxed to a position that covers the vent holes. Thus, the plant cover is automatically vented in response to thermal changes. Optionally a bias means may be provided to bias the actuator into position over the vent holes when the actuator is deflated.

The foregoing detailed description was made for purpose of illustration only and is not intended to limit the scope of the invention which is to be determined from the appended claims.

What is claimed is:

1. A thermally responsive plant cover comprising:

a strip of light transparent material having edges, and a plurality of thermally responsive actuators spaced apart along at least one edge of said strip, said actuators comprising hermetically sealed bags of a flexible and substantially gas impermeable material, said bags containing an amount of fluid which when vaporized inflates said bag, said fluid capable of being vaporized and condensed within atmospheric temperature ranges;

whereby expansion of said bags displaces that edge of said strip along which said bags are positioned.

2. A plant cover as set forth in claim 1 wherein said strip has a plurality of longitudinally spaced-apart drain apertures.

3. A plant cover as set forth in claim 1 and further including means for anchoring said strip to a location near a plant.

4. A plant cover as set forth in claim 1 wherein the fluid is a fluorinated hydrocarbon.

5. A plant cover as set forth in claim 1 wherein said bag is colored to receive and transmit a desired amount of radiation.

6. A method of growing plants in a field where climatic conditions in the field fluctuate to cool temperatures that hinder plant growth, comprising the steps of:

preparing an earthen trough to define earthen ridges, the trough having sufficient depth and width to accommodate plants of desired size;

planting in the trough;

positioning a strip of light transparent material having longitudinal edges, over the trough so the longitudinal edges of the material overlap the earthen ridges;

anchoring the strip of material along each longitudinal edge thereof to maintain the strip in a generally flattened position over the trough; and placing a plurality of spaced-apart, thermally responsive actuators between at least one longitudinal edge and one earthen ridge, said actuators capable of displacing at least a portion of the strip away from the corresponding earthen ridge to vent the trough.

7. A method as set forth in claim 9 wherein the strip has a plurality of drain holes.

8. A method as set forth in claim 7 wherein the thermally responsive actuator comprises:

a hermetically sealed bag of a flexible and substantially gas impermeable material, and a liquid capable of being vaporized and liquified within atmospheric temperature ranges, said liquid disposed within said bag is sufficient amount to inflate the bag when said liquid is vaporized.

9. A thermally responsive cover for plants comprising:

at least one strip of light transparent material arranged to define a tent covering the plants, said tent having a plurality of vent holes;

at least one flap attached to said strip near the holes, said flap capable of covering and uncovering the holes; and at least one thermally responsive actuator positioned between and attached to said flap, said actuator capable of activating said flap to open and cover said holes, said actuator comprising:

a hermetically sealed bag of flexible and substantially gas impermeable material; and a liquid capable of being vaporized and liquified within atmospheric temperature ranges, said liquid disposed within said bag in sufficient amount to inflate the bag when said liquid is vaporized.

10. A thermally responsive cover for plants comprising:

at least one strip of light transparent material arranged to define a tent covering the plants, said tent having a plurality of vent holes; and at least one thermally responsive actuator attached to said strip near said holes, said actuator capable of covering and uncovering said holes, and said actuator comprising:

a hermetically sealed bag of a flexible and substantially gas impermeable material; and a liquid capable of being vaporized and liquified within atmospheric temperature ranges, said liquid disposed within said bag in sufficient amount to inflate the bag when said liquid is vaporized.

11. A thermally responsive cover for plants comprising:

at least two strips of light transparent material, each having generally parallel longitudinal edges, said strips arranged to form a tent covering the plants where a longitudinal edge of each strip are juxtaposed to define the top of the tent;

bias means for biasing the juxtaposed edges of the strips together;

at least one thermally responsive actuator positioned between and capable of separating the juxtaposed edges of the strips, said actuator comprising:

a hermetically sealed bag of a flexible and substantially gas impermeable material; and a liquid capable of being vaporized and liquified within atmospheric temperature ranges, said liquid disposed within said bag in sufficient amount to inflate the bag when said liquid is vaporized.

* * * * *